United States Patent [19]

Zhang

[11] Patent Number: 5,548,608
[45] Date of Patent: Aug. 20, 1996

[54] LASER HEAD AND TELESCOPIC CAVITY FOR DIODE-PUMPED SOLID-STATE LASERS

[76] Inventor: Tong Zhang, 245 S. 800 E., #6, Salt Lake City, Utah 84102

[21] Appl. No.: 14,715

[22] Filed: Feb. 8, 1993

[51] Int. Cl.[6] .................................................. H01S 3/0941
[52] U.S. Cl. .............................. 372/75; 372/70; 372/72; 372/50
[58] Field of Search ................................. 372/70, 72, 75, 372/100, 101; 359/834

[56] References Cited

U.S. PATENT DOCUMENTS

| | | | |
|---|---|---|---|
| 4,380,076 | 4/1983 | Bethune | 372/72 |
| 4,623,225 | 11/1986 | Forkner | 359/834 |
| 4,731,794 | 3/1988 | Schafer et al. | 372/70 |
| 4,785,459 | 11/1988 | Baer | 372/101 |
| 4,860,295 | 8/1989 | Byer et al. | 372/70 |
| 4,945,544 | 7/1990 | Tanaka et al. | 372/70 |
| 5,033,058 | 7/1991 | Cabaret et al. | 372/75 |
| 5,048,044 | 9/1991 | Ireland | 372/75 |
| 5,086,433 | 2/1992 | Pocholle et al. | 372/75 |
| 5,139,609 | 8/1992 | Fields et al. | 372/50 |
| 5,325,384 | 6/1994 | Herb et al. | 372/75 |
| 5,371,758 | 12/1994 | Dougal | 372/70 |

OTHER PUBLICATIONS

S. R. Bowman, B. J. Feldman, J. M. McMahon, A. P. Bowman, and D. Scarl, "Laser Techniques and Frequency Conversion for a Neodymium–Based Blue Communication Transmitter," in Tunable Solid–State Lasers, vol. 5 of OSA Proceedings Series (Optical Society of America, Washington, D.C., 1989), p. 108 (no month).

V. I. Bilak, et al., *Neodymium YAG Lasers Pumped by Light Emitting Diodes*, Soviet Journal of Quantum Electronics 11(11) Nov. 1981 1471–1476.

Hanson, F et al "Laser diode pumping of neodymium Laser rods" Applied optics vol. 27, No. 1, Jan. 1, 1988.

Judith M. Dawes et al., "Q–switched, side–pumped Nd:YAG laser," OSA Ann. Meet. Technical Digest, p.89, Oct. 5, 1993.

D. S. Bethune, Appl. Opt. 20(1981)11,1897 "Dye cell design for high–power low–divergence excimer–pumped dye lasers" (No Month).

Walter Koechner: Solid–State Laser Engineering, 3 rd ed., Springer Ser. Opt. Sci., vol. 1 (Springer, Berlin, Heidelberg 1991) (No Month).

Yoshihito Hirano, CLEO"91, CFC4, P490, "Diode pumped high efficiency Nd:YLF laser with reflection type gratings" (No Month).

*Primary Examiner*—Rodney B. Bovernick
*Assistant Examiner*—Robert McNutt

[57] ABSTRACT

A corner reflector (2) is applied for a laser head to couple collimated pump beams (3) emitted from one or more diode bars (5, 8) transversely into the laser rod (1) with an even 4-sided pumping. A Keplerian telescope (23) with internal nonlinear crystal (27, 37) is employed for a compact cavity design, to achieve mode-matched pumping, compensation of the thermal lens effect, and efficient intracavity frequency conversion.

17 Claims, 3 Drawing Sheets

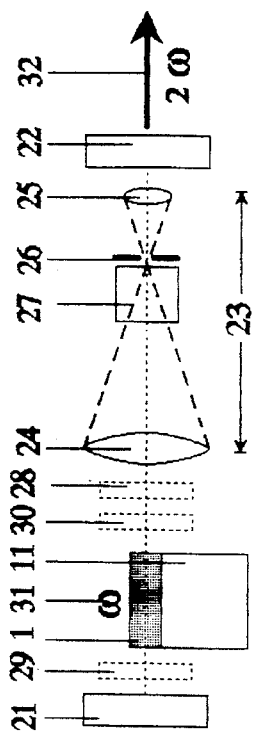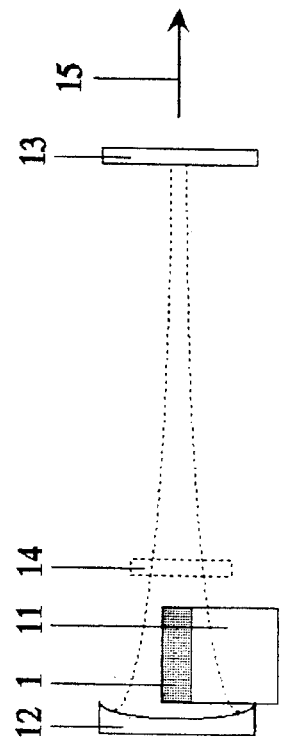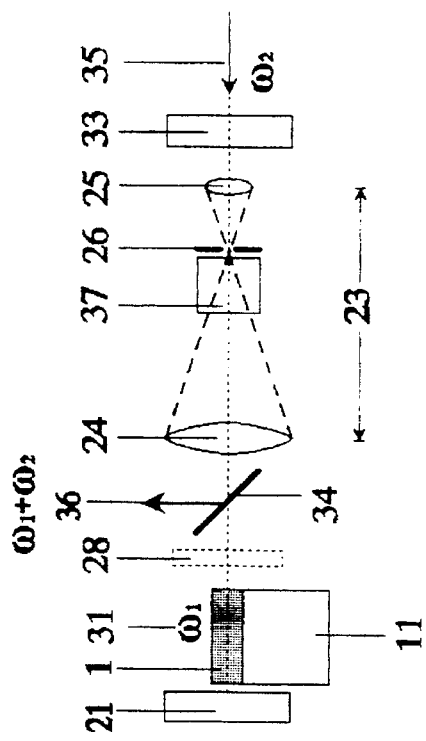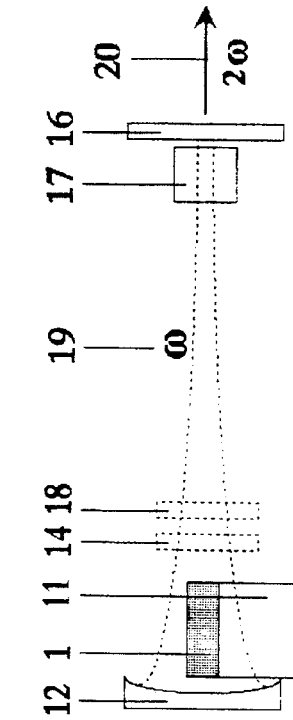
Fig. 5
Fig. 6
Fig. 4a
Fig. 4b

LASER HEAD AND TELESCOPIC CAVITY FOR DIODE-PUMPED SOLID-STATE LASERS

BACKGROUND—FIELD OF INVENTION

This invention relates generally to lasers and more particularly to pump/cavity configurations and designs, including intracavity frequency doubling and mixing, for diode pumped solid state lasers.

BACKGROUND—DESCRIPTION OF PRIOR ART

Recent advances in the development of diode-pumped solid-state lasers have begun a revolution in the development of highly efficient, extremely compact and stable all-solid-state laser systems, which are the most desirable next generation laser systems. The recent and ongoing progress in high-power laser diode bar technology has rapidly hastened this process. The most important lasing materials are crystals doped with such rare earth atoms as neodymium, which operate typically in the near infrared region, Frequency conversion techniques can then be employed to extend the operation of these sources into new spectral regions, producing efficient frequency-agile laser sources. Pumping by means of the laser diode bar, which now represents the most cost effective approach to increase output power, can also be applied to increase output power.

Compared to the conventional pumping sources, e.g., linear flash lamps or arc lamps, the laser diode promises higher energy efficiency, lower heat generation and longer life. It is hence widely expected that diode-pumped solid-state lasers are going to replace a significant fraction of existing lasers, in the next few years and beyond, in a variety of applications, including coherent radars, global sensing from satellites, communications, medical uses, micro-machining and miniature visible sources for digital optical storage.

Diode-pumped solid-state lasers are usually classified into two types based on the pump scheme, i.e., the transverse (side) pumped and the longitudinal (end) pumped type as disclosed in U.S. Pats. Nos. 4,575,854 and 3,982,201, respectively. In the side pumped type, the diode laser array shines transversely on the side of a solid laser rod or bar; this direction is normal to the axis of the solid-state laser cavity. With end pumping, the diode array focuses light onto the end of a laser rod or bar, in a direction parallel to the optical axis of the resonator.

Both end- and side-pumped geometries for diode-pumped solid-state lasers have previously been demonstrated. However, both systems have notable problems which have not been solved, and neither system fulfills all the requirements for different application needs.

The major advantage of the end-pumping scheme is its natural tendency to obtain mode-matched pumping, i.e., the overlapping of the pump volume and the resonator $TEM_{00}$ mode volume to optimize the efficiency of energy extraction from the laser rod. However, the end-pumped lasers typically operate only at low power range due to the limitation of the pump power that can be focused onto the end of the laser rod. In order to increase the output power of end-pumped designs, several studies have been carried out. The schematic of using one 2-D diode bar with a microlens array and a macrolens has been described in U.S. Pat. No. 5,139,609. But the geometry used in this study makes it incompatible to use many diode bars as the pump source. A laser architecture of the angularly multiplexed pump geometry was applied with eight 15-W linear array laser-diode bars to deliver the diode power to the rod end for another design, which was proposed by S. C. Tidwell et al. (Optics lett 18(1993)2, 116). However the cavity design in this study was not compact. In addition, the end-pumped laser output power is highly sensitive to the losses as may be introduced by the insertion of intracavity elements such as an etalon, a quarter-wave plate and so on.

The side-pumped systems, on the other hand, have little difficulty in generating high powers, but usually suffer from having a low optical gain and from the difficulty of achieving mode matching in conjunction with a compact-cavity design. This is due to the distribution of pump light over a larger volume. Moreover, good mode quality can only be obtained with pumping geometries optimized for high power operation, which calls for many diode bars to be arranged in a multifold symmetric pattern around the solid laser rod to produce uniform excitation. These geometries give rise to a scheme difficult to implement as a cost-effective low-average power system. Some improvements in such laser design were achieved by Baer in U.S. Pats. No. 4,785,459 and 4,837,771, and by Yoshihito Hirano et al. (CLEO '91, CFC4, P490). However, these approaches are still not favorably designed to use multiple laser diode bars and have some other limitations as well.

The pump/cavity configuration is a key element of any laser design and performances. The purpose of this invention is to provide a unique and novel pump/cavity configuration, which will solve the existing problems of diode-pumped solid-state lasers and lead to a major breakthrough for compact, high power coherent light sources.

OBJECTS

Pump Configuration

In general, a laser head comprises three main parts: pump source, laser material and pumping coupling optics, and is characterized by the related pump scheme.

The objective of this invention is to provide a laser head with versatile modular construction for diode-pumped solid-state laser systems. It is characterized by (1) a novel optical pumping scheme which couples the output from one or more diode bar arrays uniformly into the laser rod,
(2) compactness and high efficiency,
(3) very simple construction, ease of manufacturing and low cost,
(4) loose geometric restriction in the construction and arrangement of the diode bars and laser rod, and in inserting optical elements within the cavity,
(5) a minimal number of optical components,
(6) a large optical tolerance,
(7) an excellent formation for efficient and effective laser rod cooling,
(8) cost effectiveness laser systems with diverse output powers.

It is also the object to provide a diode-pumped solid-state laser system which readily lases with a high output power.

A further objective of the present invention is to produce a laser head which can be adapted to serve as an amplifier.

Also it is the objective to yield an RE:solid laser system which can be operated in either cw or pulsed mode of operation.

Cavity Configuration

The second part of this invention is to provide a compact cavity design with a laser head to obtain mode-match pumping and to realize high quality performances in the laser operation and in the intracavity frequency conversion. With using this design, the cavity construction has (1) compactness,
(2) a large $TEM_{00}$ mode volume in the laser rod to achieve efficient mode-matched pumping,
(3) a small spot size created by internal beam focusing for producing a high power density in the nonlinear crystal to obtain efficient intracavity frequency doubling or mixing,
(4) the capability of the operation in the intracavity frequency conversion with high amplitude and frequency stability,
(5) the capability of the $TEM_{00}$ mode and single mode operation with a minimal number of inserted optical components.

BRIEF DESCRIPTION OF INVENTION

Pump Configuration: Corner Reflector Laser Head

The present invention is a solid-state laser resonator or amplifier which employs a laser head with a novel side-pumping geometry that efficiently couples the output from one to a few tens of diode bar arrays uniformly into the laser rod.

The design concept of the side-pumping scheme with a corner reflector is shown in FIG. 1. A laser rod is mounted in a standard 45° right-angle corner reflector. The collimated pump beams emitted from diode bar(s) via a collimating lens, serving as the incident beams with a vertical dimension four times the diameter of laser rod, are incident to and then divided to four equal portions by corner reflector, to produce an even four-sided pumping of laser rod from four different directions of the top, back, front, and bottom. The active substance in the laser rod is excited by the pumping light to generate a laser beam axially along the laser rod.

FIGS. 2a–c show the pump arrangement with linear array laser-diode bar(s). Here is showing three bars as an example. A cylindrical lens is set at the front of the diode bars, serving as a collimating lens, with a distance equal to its focal length f, directs collimated light toward the corner reflector. The focal length f is chosen to be around $f=2d/\tan(\theta/2)$, thus leading to the collimated pump beams with a vertical dimension four times the diameter of the laser rod. d is the diameter of the laser rod, and $\theta$ is around 45°, the beam divergence of the laser-diode.

FIGS. 3a–c show the pump arrangement with the 2-D stacked laser diode bar(s). The collimating lens, preferably a length of optical fiber rod lens, is designed to be positioned in front of a diode bar array so that each rod lens lines up with a corresponding emitter layer. The focus length of the fiber rod lens is about 1.2 mm. The resultant array of collimated pump beams are directed toward the corner reflector. The vertical dimension of the cross section of the 2-D diode bar(s) is chosen equal to four times the diameter of the laser rod. Otherwise, it is necessary to insert an interfacing optics, such as a prism expander or its inversion, to make the vertical dimension of collimated pump beams agreeable with four times the diameter of the laser rod.

With an optimized cavity design, the cavity mode volume is matched to the central area of laser rod pumped by diode bar(s) via the corner reflector. A detailed calculation indicates that a 2–3 mm rod diameter is adequate to obtain output powers from the low to moderate high power range. Furthermore, the optimized absorption coefficient at the pump wavelength is chosen to be the value which leads to $I(d)/I(0)=10\%-13\%$ around and the rod absorption efficiency over 80%.

Cavity Configuration: Telescopic Cavity

A Keplerian telescope and internal nonlinear crystal is employed for a compact cavity design, which provide the mode-matched pumping and the efficient intracavity frequency doubling and mixing.

The schematic of telescopic resonator cavity, which involves the use of a Keplerian telescope and internal nonlinear crystal for frequency doubling and for frequency mixing, are shown in FIG. 5 and FIG. 6, respectively. Such arrangements provide a large $TEM_{00}$ mode volume in the laser rod and a high power density in the nonlinear crystal at the same time. The cavity is composed of two mirrors facing each other. The corner reflector laser head is placed at one side of the cavity for laser operation. A Keplerian telescope, or a beam-expanding telescope, which is formed by an AR coated lens pair, an internal aperture and an internal nonlinear crystal, is set at other side of the cavity to provide a small beam waist for efficient nonlinear optics actions as well as for mode control.

DRAWING FIGURES

In the drawings, closely related figures have the same number but different alphabetic suffixes.

FIGS. 2c–f show a schematic of the mechanical assembly of the laser head (here not including the diode bar) in the linear bars case.

Figure 3C:
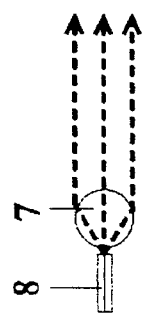
Figure 3A:
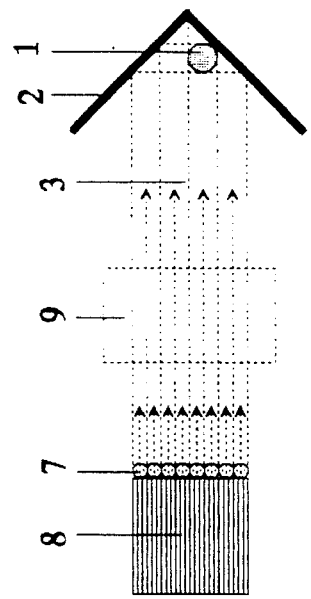
Figure 3B:
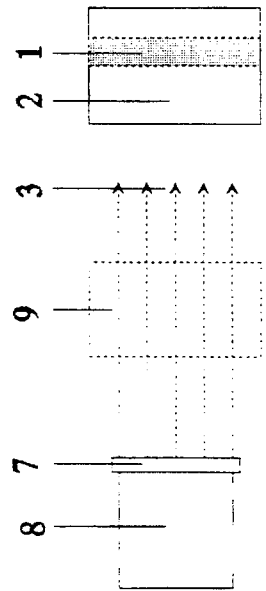

FIGS. 3a and 3b are the front and top plane views, respectively, showing an optical pump arrangement for the 2-D stacked laser diode bar(s), which is another embodiment of the laser head in accordance with the present invention.

FIG. 3c is a magnified sectional view of a single layer structure in the 2-D diode bar(s) and a relevant collimating rod lens.

FIGS. 4a and 4b are the two plane views of the schematics of the solid-state laser and a related arrangement for intracavity frequency doubling, respectively; which is one embodiment of the cavity configuration in accordance with the present invention.

FIG. 5 is a plane view of the arrangement for the intracavity frequency doubling with a Keplerian telescope and an internal nonlinear crystal; which is an alternative preferred embodiment of the cavity configuration in accordance with the present invention.

FIG. 6 is a plane view of the arrangement similar to that shown in FIG. 5, but for the intracavity frequency mixing, which is an embodiment of the cavity configuration for frequency mixing in accordance with the present invention.

REFERENCE NUMERALS IN DRAWINGS 1 laser rod 21 rear mirror
2 corner reflector 22 front mirror
3 collimated pump beams 23 Keplerian telescope
4 cylindrical lens 24 object lens
5 linear array laser-diode bar 25 eye lens
6 pump beams 26 aperture
7 fiber rod lens 27 nonlinear crystal KTP
8 2-D stacked laser diode bar 28 etalon
9 interfacing optics 29 quarter-wave plate 10a part A of laser head housing
10b part B of laser head housing
11 laser head
12 rear mirror
13 front mirror
14 etalon
15 output
16 front mirror
17 nonlinear crystal KTP
18 quarter-wave plate
19 fundamental radiation
20 harmonic output
30 quarter-wave plate
31 radiation at $\omega_1$
32 harmonic output
33 front mirror
34 dichroic beam splitter
35 radiation at $\omega_2$
36 radiation at $\omega_3=\omega_1\pm\omega_2$
37 nonlinear crystal KTP

DESCRIPTION

Pump Configuration: Corner Reflector Laser Head FIGS. 1 to 4

The present invention is to provide a laser head with side-pumping geometry for diode-pumped solid-state lasers, which results in a versatile modular construction that is extremely simple, compact and highly efficient, and capable of producing high output power.

The key idea is to use a corner reflector to produce a 4-side uniform pumping of the laser rod. Since the rod has a higher refractive index which causes a convergent effect of the incident beams and because it is pumped from four directions, the distribution of pumping lights on the rod appears quite uniform and can be concentrated on the main central area of the rod by the optimized absorption coefficient at the pump wavelength. This leads to a higher pumping density and laser gain on the central area of the laser rod. Thus, it is favorable for obtaining low-order mode operation and high output beam quality.

Figure 1:
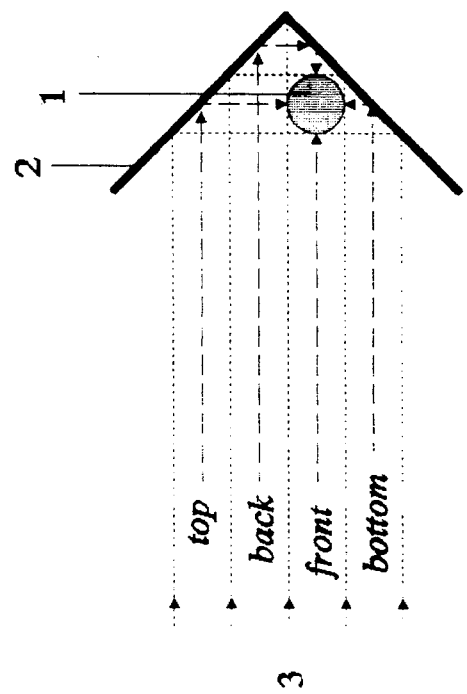
FIG. 1 shows the design concept of the pumping scheme with a corner reflector.

The design concept of the pumping scheme with a corner reflector is shown in FIG. 1. A laser rod 1 is mounted in a standard 45° right-angle corner reflector 2. The collimated pump beams 3 emitted from diode bar(s) via a collimating lens, serving as the incident beams with a vertical dimension four times the diameter of laser rod 1, are incident to and then divided to four equal portions by corner reflector 2, to produce an even four-sided pumping of laser rod 1 from four different directions of the top, back, front, and bottom. The laser rod is made of Nd:YAG or other rare earth doped solid state laser material. The active substance in laser rod 1 is excited by the pumping light to generate a laser beam axially of laser rod 1.

Figures 2C, 2D, 2E, 2F:
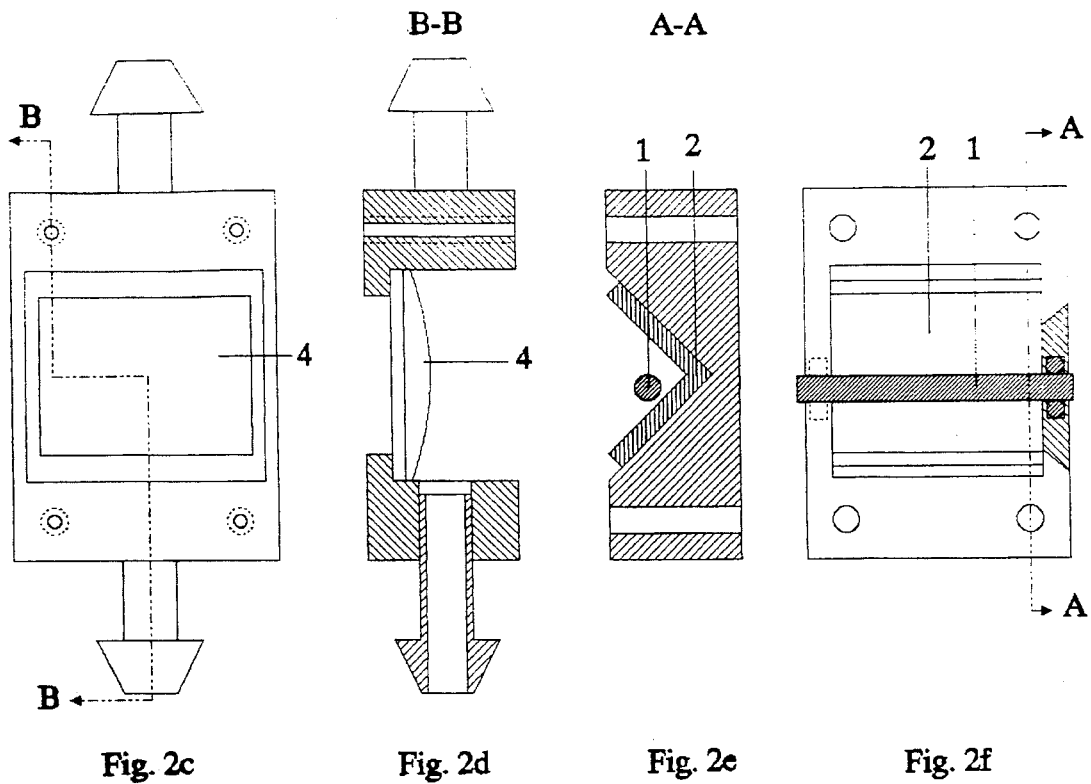
FIGS. 2a and 2b are a front and top plane views, respectively, showing an optical pump arrangement for the linear array laser-diode bars, which is one embodiment of the laser head in accordance with the present invention.
Figures 2A, 2B:
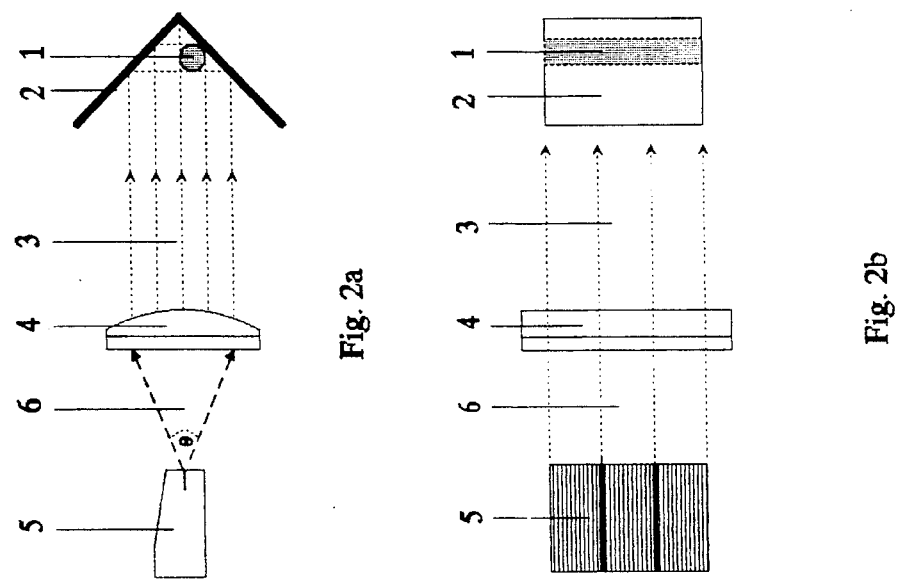

FIGS. 2a–b show the optical arrangement of the pumping scheme with linear array laser-diode bars 5; e.g., Spectra Diode Laboratories SDL-3400 series with a 10 mm×1 um emitting aperture serves as the 810-nm pump source. Here is showing three bars as an example. A cylindrical lens 4 serving as the collimating lens, set at the front of diode bars 5 with a distance equal to its focal length f, directs collimated pump beams 3 toward a corner reflector 2. The focal length f is chosen to be around f=2d/tan($\theta$/2), thus leading to collimated pump beams 3 with a vertical dimension four times the diameter of laser rod 1. d is the diameter of laser rod 1, $\theta$ is around 45°, the divergence of beam 6 of laser-diode 5. FIGS. 2a and 2b are a front and top plane views, respectively. FIGS. 2c–f show a schematic of the mechanical assembly of the laser head embodiment (here not including the diode bar) in the linear bar(s) case with the sectional and front plane views. A housing includes two half parts. One half for holding laser rod 1 and corner reflector 2 is shown in FIGS. 2e and 2f. Another half for holding cylindrical lens 4 is shown in FIGS. 2c and 2d. It can be cooled with air flow at the low power range, and with water or other fluids, i.e., immersion cooling at the high power range. This is one preferred embodiment of the laser head in accordance with the present invention.

FIGS. 3a and 3b are the front and top plane views of the optical arrangement of the pumping scheme for the 2-D stacked laser diode bar(s), respectively; which is another preferred embodiment of the laser head in accordance with the present invention. The output of each layer in the 2-D diode bar(s) 8 is collimated by a collimating lens 7, preferably a length of optical fiber rod lens, which is mounted parallel to and in a certain spaced relation with one emitter layer of diode bar(s) 8 by precision spacer means to substantially collimate the diode emission in the dimension perpendicular to the diode junction plane. The arrays in 2-D diode bar(s) 8 and a group of fiber rods lenses 7 are matched to each other geometrically in a one-to-one manner by layers. The diameter of fiber rod lens 7 and its refractive index are chosen correctly for collimating. A resultant array of collimated pump beams 3 are directed toward corner reflector 2. The vertical dimension of the cross section of 2-D diode bar(s) 8 are chosen to be equal to four times the diameter of laser rod 1. Otherwise, it is necessary to insert an interfacing optics 9, such as prism expander or its inversion, to make the vertical dimension of collimated pump beams 3 close to four times the diameter of laser rod 1.

FIG. 3c is a magnified sectional view of a single layer structure in 2-D diode bar(s) 8 and a relevant collimating rod lens in the group of rod lenses 7. But indeed, all size of the views in these figures are magnified so they are much larger than realistic models. The 2-D diode bar has 1×1 cm dimension.

The above mentioned front plane views are the perpendicular dimension view to the diode junction plane. The top plane views are the parallel dimension view to the diode junction plane.

FIGS. 4a and 4b are the two plane views of the schematics of the laser cavity and a related arrangement for intracavity frequency doubling, respectively. This is one preferred embodiment of the cavity configuration by use of the laser head, which has been presented above in FIGS. 2a–c and FIGS. 3a–c, for laser operation and for intracavity frequency doubling in accordance with the present invention. It is a hemispherical resonator or a near hemispherical resonator. The resultant mode has a relatively large diameter at the spherical mirror so as to achieve the mode-matched pumping and has a diffraction-limited point at the plane mirror for efficient frequency doubling.

Referring to FIG. 4a of the drawings, a laser resonator includes a laser head 11 and the two reflective surfaces of laser rod 1 or mirrors 12, 13. One mirror 13 may be partially reflective to the laser light in order to obtain output 15, and other mirror 12 may reflect laser light. The lasing light is reflected by the mirror means to travel back and forth between the laser resonance mirrors, while a part of the lasing light is output via mirror 13, which serves as an output coupler. An etalon 14 can be inserted for single mode operation. As an alternative, the cavity may be further simplified by applying a reflective coating to one or both end surfaces of laser rod 1, so eliminating the need for one or both of mirrors 12, 13.

FIG. 4b shows the frequency doubling case, in which the cavity arrangement is the same as that in FIG. 4a, excepting a mirror 16 replaces mirror 13 and a nonlinear crystal 17, preferably a KTP crystal, is placed close to mirror 16 for the frequency doubling. Both mirrors 12, 16 have high reflection (HR) coating for fundamental radiation 19 and front mirror 16 is transparent (HT) for second-harmonic output 20. Both faces of nonlinear crystal 17 is antireflection (AR) coated for fundamental radiation 19. A quarter-wave plate 18 is located at the front of crystal 17 for polarization control. An inserted etalon 14 is for single mode operation and amplitude noise suppression.

A Brewster plate serving as a birefringent filter or a pair of the quarter-wave plates for producing the "twisted mode" may also be placed at an optimum position in the laser cavity instead of etalon 14 to achieve low amplitude noise operation. Finally, the cavity length has to be chosen based on the crystal acceptance angles and kept constant to gain a stable output.

With an optimized cavity design, the cavity mode volume is matched to the central area of laser rod pumped by diode bar(s) via the corner reflector. A detailed calculation indicates that a 2–3 mm rod diameter is adequate to obtain output powers from the low to moderate high power range. Furthermore, the optimized absorption coefficient at the pump wavelength is chosen to be the value which leads to $I(d)/I(0)=10\%-13\%$ around and the absorption efficiency of laser rod 1 over 80%. Here $I(0)$ is the incident light intensity and $I(d)$ is the intensity of the light emerging from the other side of laser rod 1 with diameter d.

Cavity Configuration: Telescopic Cavity FIGS. 5 to 6

The second part of this invention is to provide a compact cavity design by using of a Keplerian telescope with an internal crystal to obtain mode-matched pumping and to achieve high quality performances in laser operations and in efficient intracavity frequency doubling or mixing for diode-pumped solid-state laser, particularly for those in which the corner reflect laser head are applied.

The high efficient frequency conversion requires a high power density which are generally not available from cw operation lasers. An obvious solution for this problem is to place the nonlinear crystal inside the laser resonator. Moreover, the beam cross section inside the nonlinear crystal should be small enough. Concurrently, the beam cross section must be large enough inside the laser rod to utilize the maximum rod volume which can contribute to $TEM_{00}$ mode oscillation. This generally requires that the beam cross-sectional area be at least an order of magnitude larger inside the laser rod than inside the nonlinear crystal.

The arrangement of telescopic resonator cavities, in which a Keplerian telescope 23 and an internal nonlinear crystal 27 and 37 are used for intracavity frequency doubling and for frequency mixing, respectively, are shown in FIG. 5 and FIG. 6. Such kind arrangement provides a large $TEM_{00}$ mode volume in the laser rod and a high power density in the nonlinear crystal at the same time. The cavities are composed of two mirrors 21, 22 and 21, 33 facing each other. The corner reflector laser head 11 is placed at one side of the cavity. Keplerian telescope 23 is formed with an AR coated lens pair, i.e., an eye lens 25 with focal length $f_1$ and an object lens 24 with focal length $f_2$, and an aperture 26 is placed at the focal plane where a diffraction-limited point occurs. Keplerian telescope 23 with internal nonlinear crystal 27 and 37 are set at other side of the cavities.

Keplerian telescope 23 here functions as a beam expander with magnification $M=f_2/f_1$. The distance between lens 24 and lens 25 is adjustable thereby to obtain a small defocusing for the compensation of the thermal lens of laser rod 1. Aperture 26 is actually an internal iris diaphragm and thereby is able to be adjusted to match the $TEM_{00}$ mode operation. The preferred parameters are selected as follows: the cavity length is around 15 cm; the magnification M is around 3×; focal length $f_2$ is between 6 cm and 8 cm and has to be chosen correctly based on the crystal acceptance angles; focal length $f_1=f_2/M$; mirror 21 is a plane mirror and mirror 22 and 33 are the spherical mirror.

FIG. 5 shows an arrangement for intracavity frequency doubling, with a Keplerian telescope and an internal nonlinear crystal; which is an alternative preferred embodiment of the cavity configuration in accordance with the present invention. Nonlinear crystal 27, preferably a KTP crystal or $MgO:LiNbO_3$ crystal, is placed close to aperture 26 for the frequency doubling. Both mirrors 21, 22 have HR coatings for the fundamental radiation 31 and front mirror 22 is transparent for second-harmonic output 39. Both faces of nonlinear crystal 27 is AR coated for fundamental radiation 31. An inserted etalon 28 is used for the single mode operation and the amplitude noise suppression.

Optionally, a Brewster plate serving as a birefringent filter or a pair of the quarter-wave plates 29, 30 for producing the "twisted mode" may also be placed at an optimum position in the laser cavity to achieve single mode and low amplitude noise operation.

FIG. 6 shows an arrangement for frequency mixing, with a Keplerian telescope and an internal nonlinear crystal; which is a preferred embodiment of the cavity configuration for frequency mixing in accordance with the present invention. The frequency mixing between a radiation 31 and a radiation 35 occurs in crystal 37, produces a mixing radiation 36 for output. Radiation 31 is provided by laser head 11 and radiation 35 comes in from another laser system through front mirror 33. Nonlinear crystal 37, preferably a KTP crystal, is placed close to aperture 26 for the frequency mixing. Both faces of nonlinear crystal 37 is AR coated for radiation 31 and 35. Both mirrors 21, 33 have HR coatings for the radiation 31. Front mirror 33 is transparent for radiation 35.

CONCLUSION, RAMIFICATIONS, AND SCOPE OF INVENTION

While the above description contains many specificities, these should not be construed as limitations on the scope of the invention, but rather as some exemplifications of preferred embodiments thereof. Many other variations are possible.

For example, another formation of the corner reflector is a liquid immersion corner reflector or liquid prism corner reflector, i.e., a prism-like envelope is filled inside by the liquid whose refractive index is close to that of the envelope. The two hands of the envelope can be made up of the thin plate of optical glass or quartz. The front face is a plate which must be transparent at the pump wavelength.

A further formation of the corner reflector is a 45° right-angle solid prism with a hole drilled through it, in which the laser rod is positioned congestively. The material used for the prism should be transparent at the pump wavelength and has a good thermal conductivity, such as gallium phosphide (GAP) crystal and amorphous compounds or glasses.

An extra polarization beam split plus a quarter-wave plate can be inserted at the front of corner reflector serving as an optical isolator in case the feedback of the pumping light, which is reflected from the corner reflector, interferes in the operation of the laser-diode.

On the other hand, setting an extra polarization beam split, a half-wave plate and prism reflector or other kind optical element at the front of corner reflector, the polarization pumping can be provided by the present invention without appreciable losses. On such situation, the pumping beam is divided to two parts with different polarity at first and then delivered to the corner reflector by space-sharing.
Pump Configuration: Corner Reflector Laser Head The present invention is to provide a laser head with the side-pumping geometry for laser diode bar(s) pumped neodymium or other rare earth doped solid state laser. This pumping scheme couples the pump light efficiently from one to a few tens of diode bar arrays transversely into the laser rod, resulting in an extremely simple, compact and highly efficient laser head assembly with a versatile modular construction, and cost effective laser systems with a variety of output powers.

There are several advantages of this pump arrangement over other types. First, the major limitation on the prior arts of the diode pumped solid state laser is the efficiency and effectiveness of the pump source. The present pump scheme overcomes this disadvantage in dramatic fashion, thereby largely improving performances. On the other hand, there is very loose geometric restriction in the construction and arrangement of the diode bars and laser rod, and in inserting optical elements within the cavity. Thus it is possible to apply most of the technologies in the field of solid state laser systems for the present case.

Second, the pump-light delivery optics is extremely simple and has a highest diode-to-rod efficiency (greater than 97%) and largest optical tolerance. Since it effectively contains only one collimating lens, such as the cylindrical lens or the fiber rod lens, so it can be easily antireflection coated at pump wavelength. This embodiment has the potential for demonstrating a high overall efficiency with the optimization of the cavity design.

Third, this design provides the simplest way to employ diode bars rather than the use of many individual diodes that would require separate power supplies and temperature controllers to maintain the correct output. Diode bars are by far the most reliable, long-lived, compact and economical means for pumping high-power solid-state lasers.

Fourth, the corner reflector laser head provide an excellent formation for efficient and effective laser rod cooling.

Fifth, it is very easy to manufacture with low cost by comparison. Such laser head will not only have wide applications in the production but also will be easy to manufacture on a mass production scale, thereby lowering costs and leading to even more practical uses.

Conclusively, this invention supports a wide variety of laser devices. Up to the limits of output power, physical space or disruptive heating, one can employ many bars, pulsed or continuous wave. It offers very good beam quality, ease of alignment, good coupling efficiency and the capability of handling wide range operations of output power. The laser head can also serve as an amplifier. The simple geometry of the approach opens the resonator to applications of various prior arts, such as Q-switching, cavity-dumping, mode locking and frequency conversion.
Cavity Configuration: Telescopic Cavity The cavity design with Keplerian telescope and internal nonlinear crystal is compact, and provides high quality performances in laser operations, in the mode-matched pumping and in the efficient intracavity frequency doubling and mixing with improved beam quality. It also provides a unique and powerful configuration for the intracavity wavelength conversion. Such arrangement makes the Keplerian telescope provide four important functions.

First, as an adjustable element, by a small defocusing, it can be corrected to achieve the compensation for the thermal lens effect so as to realize stable laser operations.

Second, as a beam expander, it provides a large $TEM_{00}$ mode volume in the laser rod so as to obtain mode-matched pumping.

Third, as a spatial filter, the size of the aperture within the Keplerian telescope which is actually an internal iris diaphragm, can easily be adjusted to filtrate high order mode operations so as to achieve the $TEM_{00}$ mode operation and high beam quality.

Fourth, with the internal beam focusing, it provides a small beam spot to obtain a high power density in the nonlinear crystal thus leading to efficient nonlinear optics actions.

What is claimed is:

1. A solid-state laser head for producing coherent light, comprising: a solid-state laser material means with a largest cross sectional dimension d and a refractive index higher than the periphery, a diode bar means and a corner reflector means;

wherein a) multiple micro-beams are produced by many individual emitters located within said diode bar means, based on the multiple micro-beams collective effect, serving as multiple incident beams;

b) said corner reflector means reflects and divides the compilation of said multiple incident beams to four equal portions, and produces 4-side uniform pumping light into said solid-state laser material means from four different directions of the top, back, front, and bottom; and said solid-state laser material means is mounted within said corner reflector means;

c) the absorption coefficient of said solid-state laser material at the pump wavelength is predetermined in the optimized condition, including the concentration of the pump power in the central lasing area, so as to obtain high pump density and laser gain in the central lasing area and high absorption efficiency of said laser material means, whereby resulting in a favorable condition for realizing the high quality laser operation, that is, mode-matched pumping, low order modes or $TEM_{00}$ mode operation, good output beam quality and high efficiency; wherein said absorption coefficient in said optimized condition is chosen to be the value which leads to $I(d)/I(O)=10\%-13\%$ around, where $I(O)$ is the intensity of the pump light incident on the laser material means and $I(d)$ is the intensity of the pump light emerging from the side of the laser material opposite the incident side;

d) further comprising an optical conditioning means, so that said multiple incident beams are collimated at least in one dimension and whose compilation has a vertical dimension four times of said dimension d; each of said portions having a vertical dimension equal to said dimension d whereby resulting in said incident beams to converge inward from the surface toward the central lasing region.

2. A solid-state laser head of claim 1, wherein said laser material means is a solid-state laser rod means with diameter d.

3. A solid-state laser head of claim 1, wherein said diode bar means is one or more linear array diode bars.

4. A solid-state laser head of claim 3, wherein said optical conditioning means is a collimating lens means.

5. A solid-state laser head of claim 4, wherein said collimating lens means is a cylindrical lens means.

6. A solid-state laser head of claim 5, further comprising an housing with means for holding said laser material means, said corner reflector means, said cylindrical lens means and said linear array laser-diode bars in the predetermined position, and for constructing said laser head.

7. A solid-state laser head of claim 1, wherein said diode bar means is one or more 2-D stacked diode bars.

8. A solid-state laser head of claim 7, wherein said optical conditioning means is a collimating lens means.

9. A solid-state laser head of claim 8, wherein said collimating lens means is a group of fiber rod lenses.

10. A solid-state laser head of claim 9, wherein said optical conditioning means further comprises an interfacing optics means.

11. A solid-state laser head of claim 10, wherein said interfacing optics means consists of one or more prisms.

12. A solid-state laser head of claim 11, further comprising an housing with means for holding said laser material means, said corner reflector means, said collimating lens means, said interfacing optics means and said 2-D stacked laser-diode bars in the predetermined position, and for constructing said laser head.

13. A solid-state laser head of claim 1, wherein said solid-state laser material means is a rare earth doped solid-state laser material means with antireflection coating at the pump wavelength.

14. A solid-state laser head of claim 1, wherein said corner reflector means is a standard 45° right-angle corner reflector which can be filled with a cooling fluid for cooling.

15. A solid-state laser head of claim 1, wherein said corner reflector means is a hollow right-angle prism having a prism-like envelope, which is filled with liquid whose refractive index is close to that of the envelope.

16. A solid-state laser head of claim 1, wherein said corner reflector means is a 45° right-angle solid prism with a hole drilled through it, in which said laser material means is positioned congestively.

17. A solid-state laser head of claim 1, said laser head is a laser amplifier.

* * * * *